United States Patent
Erlacher et al.

(10) Patent No.: US 10,501,134 B2
(45) Date of Patent: Dec. 10, 2019

(54) METHOD FOR PRODUCING A VEHICLE

(71) Applicant: MAGNA STEYR Fahrzeugtechnik AG & Co KG, Graz (AT)

(72) Inventors: Manuel Erlacher, Radenthein (AT); Reinhard Hoermann, Hitzendorf (AT); Franz Planka, St. Andrae (AT); Harald Zachnegger, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 33 days.

(21) Appl. No.: 15/876,474

(22) Filed: Jan. 22, 2018

(65) Prior Publication Data

US 2018/0229788 A1   Aug. 16, 2018

(30) Foreign Application Priority Data

Feb. 15, 2017   (EP) .................................. 17156247
Apr. 28, 2017   (EP) .................................. 17168670

(51) Int. Cl.
| | | |
|---|---|---|
| *B62D 65/02* | (2006.01) | |
| *B62D 65/06* | (2006.01) | |
| *B62D 25/20* | (2006.01) | |
| *B60K 1/04* | (2019.01) | |
| *B60L 50/64* | (2019.01) | |

(52) U.S. Cl.
CPC .............. *B62D 65/024* (2013.01); *B60K 1/04* (2013.01); *B60L 50/64* (2019.02); *B62D 25/2009* (2013.01); *B62D 65/02* (2013.01); *B62D 65/06* (2013.01); *B60K 2001/0438* (2013.01)

(58) Field of Classification Search
CPC .. B62D 65/024; B62D 25/2009; B62D 65/02; B62D 65/06; B60L 50/64; B60K 1/04; B60K 2001/0438
See application file for complete search history.

(56) References Cited

U.S. PATENT DOCUMENTS

| | | | |
|---|---|---|---|
| 4,978,164 A | 12/1990 | Nakamura et al. | |
| 6,334,252 B1* | 1/2002 | Sato .................. | B23K 26/0838 29/897.2 |
| 6,726,438 B2 | 4/2004 | Chernoff et al. | |
| 2012/0139292 A1* | 6/2012 | Hofer .................. | B62D 63/025 296/181.1 |
| 2012/0175897 A1 | 7/2012 | Rawlinson et al. | |
| 2013/0334839 A1* | 12/2013 | Grevener ........... | B62D 25/2009 296/193.07 |

(Continued)

FOREIGN PATENT DOCUMENTS

| | | |
|---|---|---|
| DE | 102010030295 A1 | 12/2011 |
| DE | 102010055957 A1 | 6/2012 |

(Continued)

*Primary Examiner* — Lori L Lyjak
(74) *Attorney, Agent, or Firm* — Jordan IP Law, LLC; Todd A. Vaughn (57) ABSTRACT

A method for producing a motor vehicle having a body shell that includes a platform composed of metal and a vehicle body composed of metal which is fitted on the platform. The method includes producing, separately from a remainder of the body shell, a main floor module that includes a main floor of the body shell and at least one drive-specific component, and attaching the main floor module to an already dip-coated platform and/or to an already dip-coated vehicle body.

14 Claims, 10 Drawing Sheets

(56) References Cited

U.S. PATENT DOCUMENTS

| | | | | |
|---|---|---|---|---|
| 2014/0082918 A1* | 3/2014 | Grevener | ............ | B62D 25/2009 29/469 |
| 2016/0083623 A1* | 3/2016 | Wczasek | .................. | C09D 1/00 523/456 |
| 2016/0298250 A1* | 10/2016 | Markou | ................... | C25D 5/48 |

FOREIGN PATENT DOCUMENTS

| | | | | |
|---|---|---|---|---|
| EP | 2463181 A2 | 6/2012 | | |
| FR | 3026079 A1 | 3/2016 | | |
| JP | H0524563 A | 2/1993 | | |
| WO | WO-9818670 A1 * | 5/1998 | ............. | B62D 27/02 |

* cited by examiner

METHOD FOR PRODUCING A VEHICLE

CROSS-REFERENCE TO RELATED APPLICATIONS

The present application claims priority under 35 U.S.C. § 119 to European Patent Application Nos. EP 17156247.3 (filed on Feb. 15, 2017) and EP 17168670.2 (filed on Apr. 28, 2017), which are each hereby incorporated by reference in their respective entireties.

TECHNICAL FIELD

Embodiments relate to a method for manufacturing a motor vehicle, and a method for manufacturing a group of motor vehicles having different drives.

BACKGROUND

It is known that motor vehicles may be manufactured in various construction types, for example with a self-supporting body or a body which is not self-supporting and which may be built on a supporting platform which is also known as a frame, an underbody or a chassis.

As a so-called "body shell," a motor vehicle may comprise such a platform composed of metal and a body composed of metal, which is fitted on the platform.

Various drives for motor vehicles are also known, such as a petrol drive, an electric drive, a hybrid drive or a drive using alternative fuels such as natural gas, hydrogen and alcohol. These drives require different installation spaces in the vehicle architecture, especially in the floor region. The very different energy stores of the drives are conventionally located in this region. In conventional methods for manufacturing motor vehicles, a wide variety of body variants are therefore produced for combinations of various drives, different colors and different vehicle types, for example, estates, limousines etc., which have to be held available in a storage zone after coating (so-called "paint buffers") so that they may be retrieved quickly for manufacturing a desired complete vehicle.

SUMMARY

Embodiments relate to a method for manufacturing a motor vehicle and a group of vehicles, which enables simpler and more economical production of vehicles in different variants, in particular, drive variants.

In accordance with embodiments, a method for manufacturing a motor vehicle having a body shell that includes a platform composed of metal and a body composed of metal, which is fitted on the platform, the method including producing, separately from the remaining components of the body shell, a main floor module comprising a main floor of the body shell and at least one drive-specific component, and then attaching an already dip-coated platform and/or an already dip-coated body.

In accordance with embodiments, a main floor module, which is designed for a particular drive of the motor vehicle, is manufactured separately from the rest of the body shell, i.e., separately from the platform and from the vehicle body, and, where necessary, dip-coated separately. Such finished main floor modules, comprising the main floors thereof, may then be stored or held available in a space-saving manner for further use with already dip-coated platforms and/or already dip-coated bodies prepared in parallel to said floor modules.

Embodiments thus enable late variation of the bodies, which only takes place during assembly. Standardizing the body shell or the substructures, i.e., the platforms and/or the bodies, reduces the demands on the "paint buffer" during the production process, i.e., the storage area for all body variants and paint variants after coating. The main floor modules specific to the drive may be produced as separate modules, for example, in a pre-assembly line, stored temporarily as required and supplied to the main assembly line.

In accordance with embodiments, the feature "body shell" comprises the components platform, main floor, and body.

In accordance with embodiments, the main floor module is attached to the already dip-coated platform and/or to the already dip-coated body in an assembly line. In particular, the assembly of the main floor module may take place on the same assembly line and/or contemporaneously as the assembly of the drive on the body shell.

In accordance with embodiments, attachment parts are assembled on the platform and/or on the vehicle body after the dip coating and before the attaching of the main floor module to the rest of the body shell. The assembly may advantageously take place such that an assembly fitter or an assembly tool may utilize the accessibility to the vehicle interior through the open floor of the body shell, since the main floor together with the main floor module is only incorporated later. In particular, an assembly fitter may work on an assembly line standing inside the vehicle.

In accordance with embodiments, the at least one drive-specific component may be a shallow storage device, such as, for example, a drive battery, and/or a drive shaft for a combustion engine drive, an electric drive, a hybrid drive or an alternative drive. The main floor module may therefore have a plurality of attachment parts at the time of attaching to the rest of the body shell, i.e., it may already be equipped, and may also comprise a plurality of drive-specific components.

In accordance with embodiments, the cover of the shallow storage device may, at the same time, form the main floor of the body shell so that there is no clearance between the cover and the main floor, at least in sections. This feature thereby enables a particularly compact construction.

In accordance with embodiments, contemporaneously with attaching the main floor module to the rest of the body shell, the main floor module may comprise a carpet on the upper side of the main floor and/or at least one (e.g., two or four), assembled car seats and/or a bench seat.

In accordance with embodiments, the platform and/or the vehicle body and/or the main floor module are stored, at least temporarily stored, after the dip coating and before the attaching of the main floor module to the rest of the body shell. The individual components may therefore be held, finish coated, ready for further use.

In accordance with embodiments, the main floor module is attached, in particular, via an adhesive or mechanical screw(s), to the platform in the assembly direction from below or from above.

In accordance with embodiments, after the attaching of the main floor module to the platform, body modules for forming the vehicle body may be attached to the platform. Such body modules may comprise, for example, a side panel module, a roof module, and/or a rear closure module.

In accordance with embodiments, the body modules may already be equipped at the time of attaching to the platform, for example, with interior trims, electric cables, carpets, and/or handles.

In accordance with embodiments, the main floor module may also be attached, in particular, via an adhesive or mechanical screw(s), to a complete body with an already attached platform in the assembly direction from below. It is also possible in this case to produce the platform as part of the vehicle body from the start so that it is never present as a separate component in the manufacturing process.

If a main floor is to be attached to a complete body, i.e., including a platform, side panels, roof etc., an assembly direction which is "from below" still makes economic sense. If the main floor is to be attached just to the bare platform, an assembly direction "from above or from below" is possible owing to the accessibility at this time.

In accordance with embodiments, a method for manufacturing a group of motor vehicles that includes at least a first motor vehicle and a second motor vehicle, the method comprising producing the first motor vehicle and the second motor vehicle in the manner described hereinabove, and in which identical main floor modules are attached to different platforms and/or to different bodies of the first motor vehicle and the second motor vehicle. The manufacturing method in accordance with embodiments makes it therefore possible to use similar main floor modules for different bodies and/or platforms, for example, for producing vehicles of different types or in different colors. Therefore, fewer different main floor modules have to be held available.

In accordance with embodiments, for the first motor vehicle and the second motor vehicle, it is also possible for different main floor modules to be attached to otherwise identical platforms and/or to identical bodies of the first motor vehicle and the second motor vehicle so that it is possible to produce suitable floors and drive-specific components for various drive systems whilst always enabling access to the same bodies and/or platforms, which again simplifies storage.

DRAWINGS

Embodiments will be illustrated by way of example in the drawings and explained in the description below.

DESCRIPTION

Figure 1:
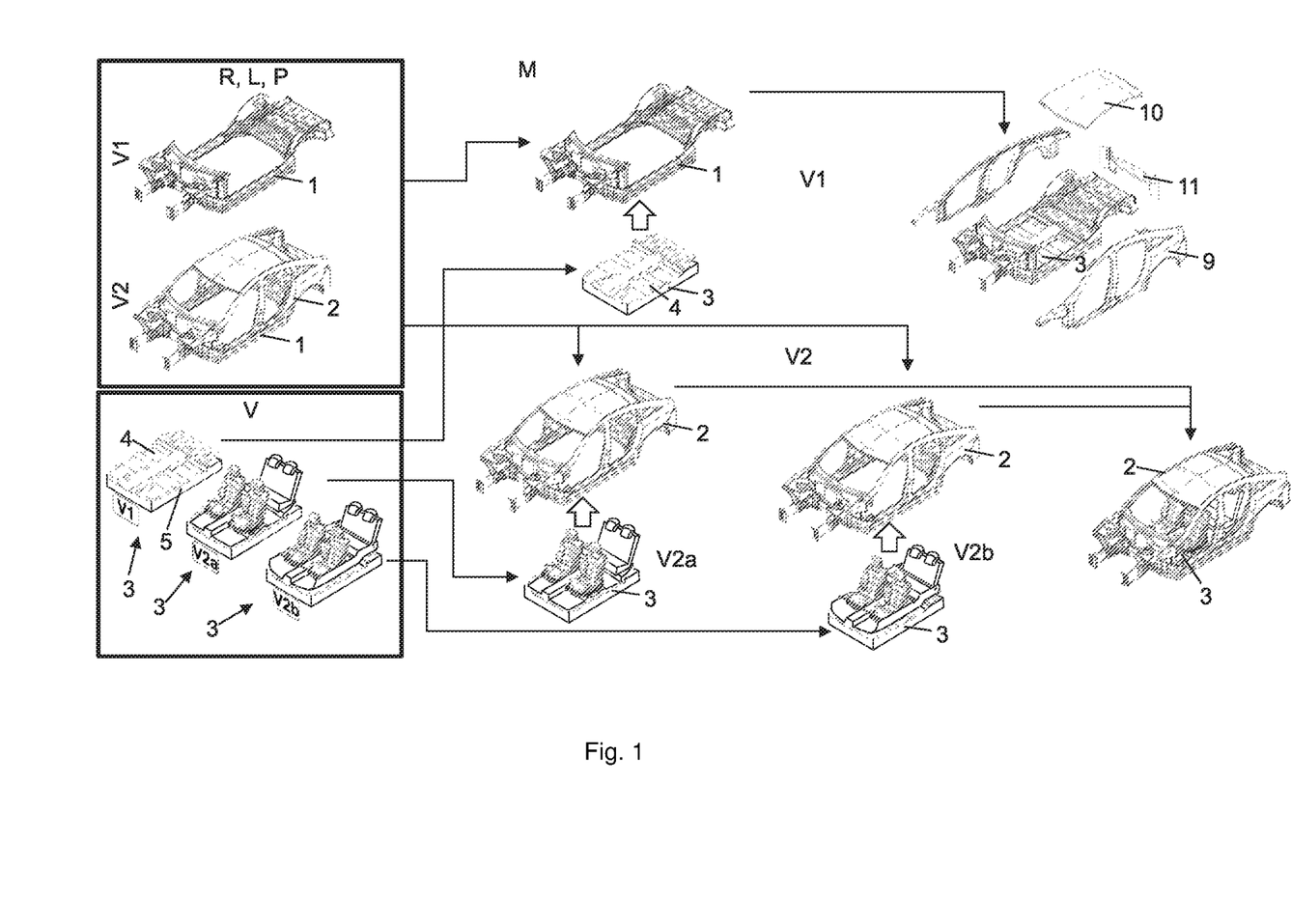
FIG. 1 illustrates a method of producing a vehicle, in accordance with embodiments.

As illustrated in FIG. 1, a method for manufacturing a plurality of motor vehicles in a production plant, is illustrated in a first variant V1 (illustrated at the top) and a second variant V2 (illustrated at the bottom). Via such a manufacturing method, it is possible to complete standardized platforms and/or bodies during assembly with a drive-specific main floor module.

In the first variant V1, standard platforms 1 are manufactured in body shell production R and drive-specific main floor modules 3 and model-specific body modules 9, 10, 11 of a body 2, for example, side panels 9, a roof 10, and a rear closure 11, are manufactured in parallel thereto.

These assemblies then arrive in painting L and are dip-coated and the model-specific body assembly structures, i.e., body modules 9, 10, 11, are preferably additionally top coated in a desired vehicle color.

In a "paint buffer" P, for example, a body storage area for storing bodies 2 and body modules, the platforms 1 and bodies 2 or their modules 9, 10, 11 may be stored ready for retrieval.

The assemblies may be stacked in a space-saving manner. Particularly in the case of the standard platforms 1, it is only necessary for a few to be stored. The model-specific body assembly structures 9, 10, 11 also require little space since they are not yet welded to high-volume bodies. It is therefore possible to realize many color variants in a simple manner. After retrieving the model-specific assembly and the drive-specific assembly, the drive-specific floor group, i.e., the main floor module 3, is firstly joined to the standard platform 1 from above or preferably from below. The now drive-specific platform 1, including the main floor module 3 and its main floor 4, is now equipped with electrics, a chassis, a drive and other equipment. The model-specific body assembly structures, body modules 9, 10, 11, are equipped in parallel thereto if this has not already taken place previously.

In an assembly station M, in particular, a "framing station," these assemblies 1, 2, 3, 9, 10, 11 are joined to form a complete vehicle. With this, a very late variation of the vehicle model takes place. It is therefore advantageously possible to realize a short main line for the assembly and transfer of the production items in the pre-assembly lines V with optimal accessibility, and therefore advantages in the production time.

Figure 2A:
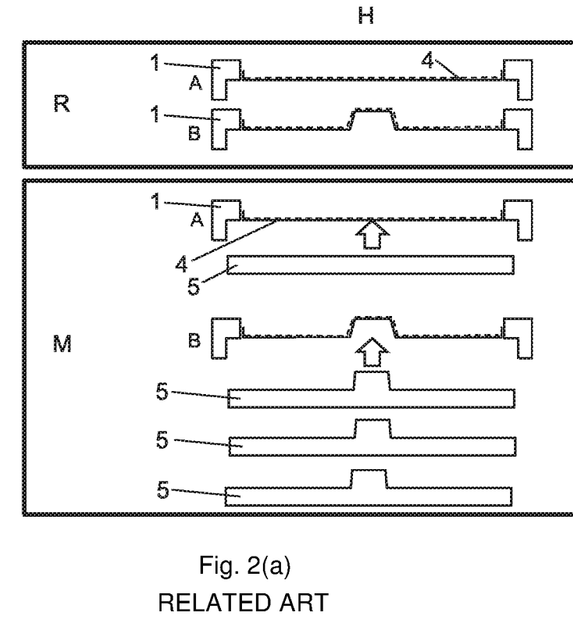
FIGS. 2(a) and 2(b) respectively illustrate the assembly of a main floor, drive-specific components, and a platform in a conventional construction type (2(a)) and a construction type (2(b)) in accordance with embodiments.
Figure 2B:
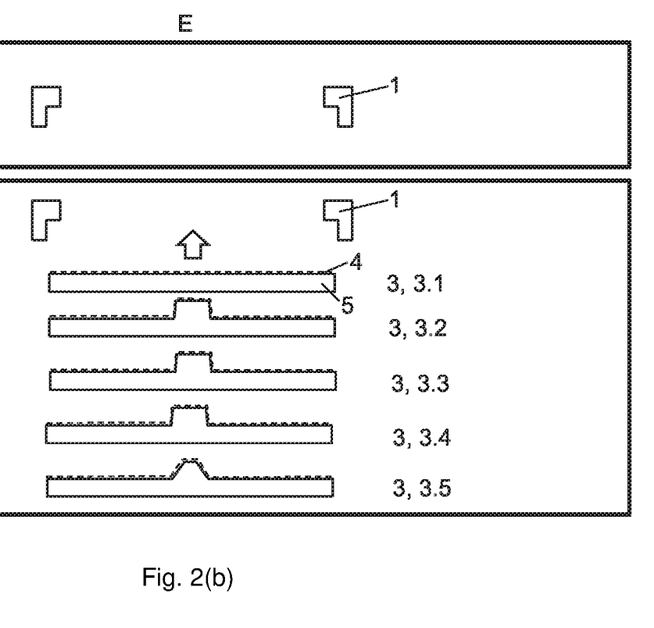
Figure 3A:
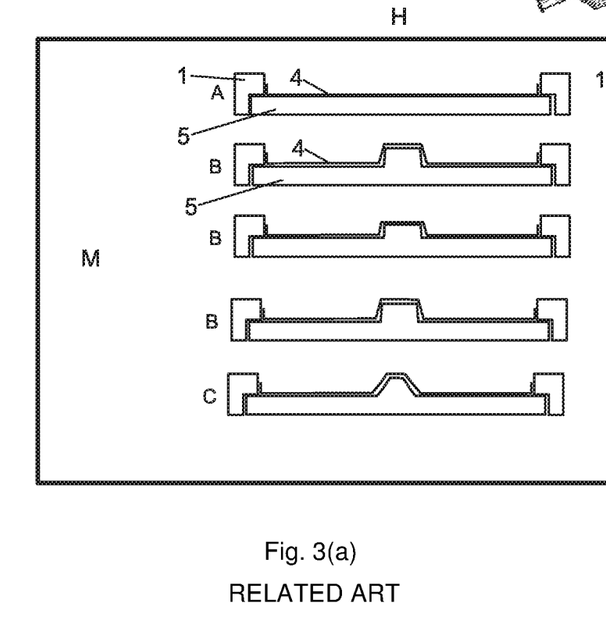
FIGS. 3(a) and 3(b) respectively illustrate a main floor, drive-specific components and a platform in a conventional construction type (3(a)) and a construction type (3(b)) in accordance with embodiments.
Figure 3B:
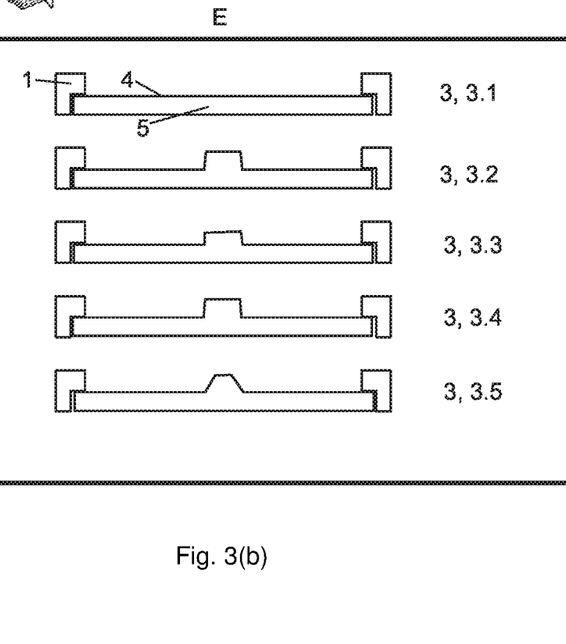

The drive-specific floor group, i.e. the main floor module 3, may be built in a pre-assembly line V and adapted to various drive forms such as combustion engine, electric motor, hybrid drive etc., as illustrated in FIGS. 2 and 3.

As illustrated in FIGS. 2(a) and 2(b), in which the left column illustrates a conventional construction type H in each case and the right column illustrates n construction type E in accordance with embodiments with body shell production R and in assembly M, the body shell or the platform 1 already has a main floor 4 in conventional production R, and shallow storage devices or other drive-specific components 5 are then attached to the main floor 4 in assembly M (left). The main floor 4 has to already be designed differently for various drive variants in body shell production R, for example, in the main floor variants A and B.

In accordance with embodiments, the body shell or the platform 1 is not yet equipped with a main floor 4 or main floor module 3 in body shell production R (right) and may therefore be held available irrespective of the drive variants. Only in assembly M is the main floor 4, together with the further components of the main floor module 3, assembled on the platform 1 or a body 2 constructed with a platform 1.

The illustrated main floor modules 3, main floor module with shallow storage device 3.1 and 3.2, main floor module with combustion engine drive module 3.3 or with hybrid drive module 3.4 or with alternative drive module 3.5, have various geometries along the main floor 4, in particular, on the upper side, which may, at the same time, form a cover or a cover plate of the respective shallow storage device or drive module. The main floor 4 of the main floor module 3 here also forms the sealing plane with respect to the interior of the vehicle in each case, which sealing plane is illustrated as a dashed line.

The fully assembled units, platform 1 with main floor 4 in different variants A, B and C and with drive-specific components 5, are illustrated in FIGS. 3(*a*) and 3(*b*) in the sectional illustration indicated above, again on the left for a conventional construction type H and on the right for a construction type E in accordance with embodiments. The units in accordance with embodiments are notable in that they do not have a clearance or dead space between the cover of the shallow storage device and the main floor 4.

The main floor module 3 may also be configured differently in an additional respect; for example, its main floor 4 either may or may not comprise the region of a rear seat arrangement. The platform 1 may likewise be prepared accordingly to receive a main floor 4 with or without a rear seat arrangement and may therefore itself be equipped with or without a rear seat arrangement. It is advantageous when including the rear seat arrangement region in the main floor 4 that the seat geometry, i.e., the seat height, the distance from front to back for all occupants, the position in the vehicle longitudinal direction and transverse direction, and the energy store geometry may be adapted in a single assembly, namely the main floor module 3, with low tolerances.

Standard platforms 1 and (drive-)specific main floors 4, for example, simple floor plates, are dip-coated in parallel and separately. Furthermore, assemblies of the vehicle structure 2, for example, side panel modules 9, roof modules 10, rear closure modules 11, are likewise coated, in any case top coated and, in the case of metal parts, also previously dip-coated.

In the actual vehicle assembly M, the (drive-)specific main floor module 3 matching the respective vehicle model is incorporated in the standard platform 1 in the assembly direction from below (see FIG. 1, first variant V1), attached by adhesion using an adhesive and optionally additionally mechanically via screws. It would also alternatively be possible to assemble the main floor module 3 in the platform 1 from above.

Alternatively, the body assembly structures 9, 10, 11 may already be equipped before their assembly on the standard platform 1 and may contain for example, an interior trim, electrical cables, carpet, handles etc. This variant usually leads to an even later variation of the production process since the (body) structure is only added late in the vehicle assembly, i.e., the variations estate, limousine, hatchback etc. are only created late in the production process.

In accordance with embodiments, the second variant V2 (see FIG. 1, second variants V2, V2*a*, V2*b*), standard bodies 2 of a vehicle model without a floor group, i.e., without a main floor 4, are produced in shell production R. The main floors 4 are manufactured in parallel as drive-specific assemblies, namely, as main floor modules 3, in a pre-assembly line V. The standard bodies 2 and the drive-specific main floors 4 are dip-coated in painting L and the vehicle body 2 is also top coated. In a pre-assembly line V, the main floors 4 are completed to form main floor modules 3. In the "paint buffer" P, the bodies 2 are stored in different colors.

In an assembly line M, attachment parts may be assembled on the vehicle body, in particular, after the dip coating and before the attaching of the main floor module 3 on the rest of the body shell.

Figure 4:
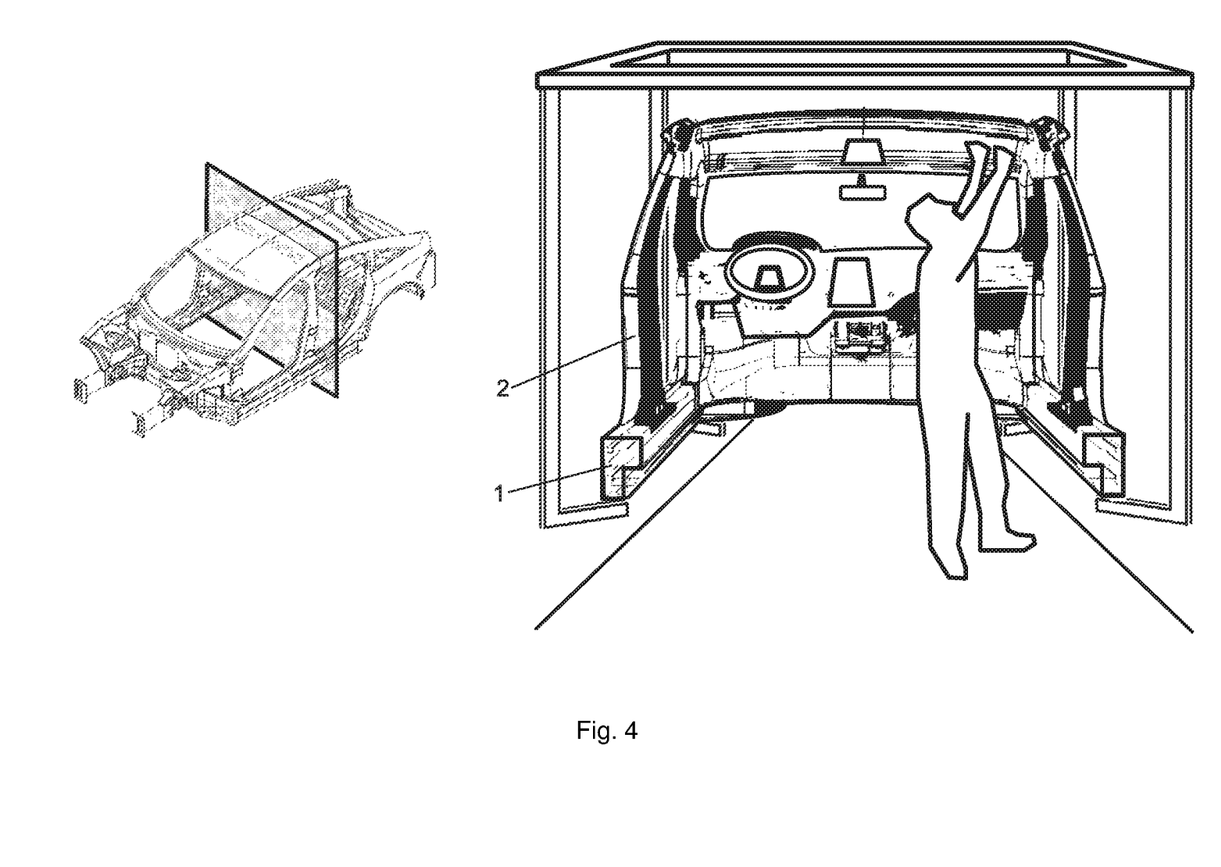
FIG. 4 illustrates the assembly of attachment parts on a body in a method in accordance with embodiments.

As illustrated in FIG. 4, which illustrates a section corresponding to the small representation on the left in FIG. 4, the assembly may advantageously take place such that an assembly fitter or an assembly tool may utilize the accessibility to the vehicle interior through the open floor of the body shell 1, 2, since the main floor 4 is only incorporated later, together with the main floor module 3. An assembly fitter may therefore work on an assembly line standing inside the vehicle. The vehicle body 2 may then be equipped with the drive-specific main floor module 3 in assembly M, wherein the main floor module 3 is preferably added in the assembly direction from below.

As a result of standardizing the vehicle body 2, it is possible to save on a lot of space in the storage zone "paint buffer" P since it is only the various colors that have to be held available and not all varieties of drive-specific bodies, each in every color. It is thus possible to manufacture additional variants of a vehicle in a simple manner.

By way of example for main floor modules 3 with shallow storage devices, corresponding to the third variant 3.2 in FIG. 3, FIGS. 5 to 10 respectively illustrate the assembly thereof on the vehicle body 2 or the platform 1, in particular on a sill 26.

An assembly adhesive and/or a screw connection is provided as a connection type in the assembly line M for both the first variant V1 and the second variant V2, which screw connection contributes, for example, to securing the adhesion for the hardening process and increasing the rigidity and strength of the vehicle body.

Figure 5:
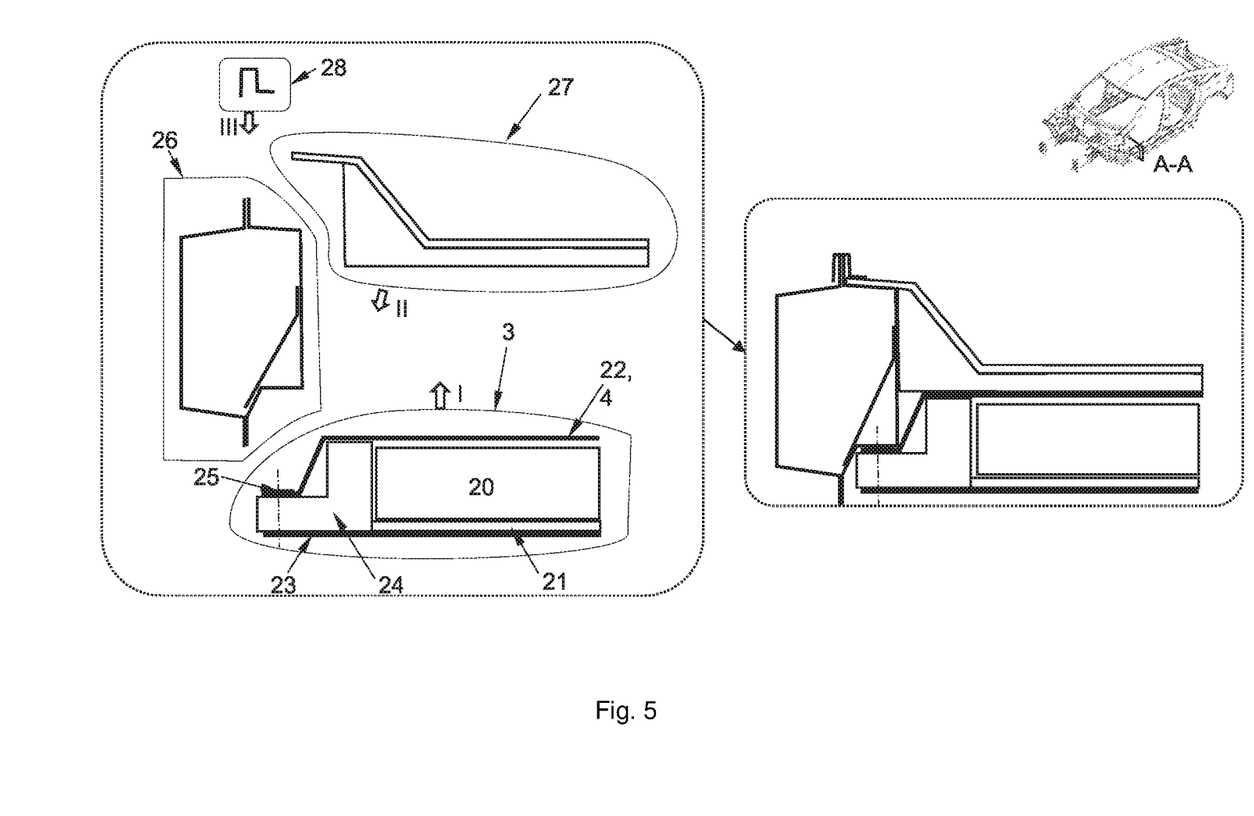
FIG. 5 illustrates the assembly of a main floor module with a shallow storage device on a platform, in accordance with embodiments.
Figure 6:
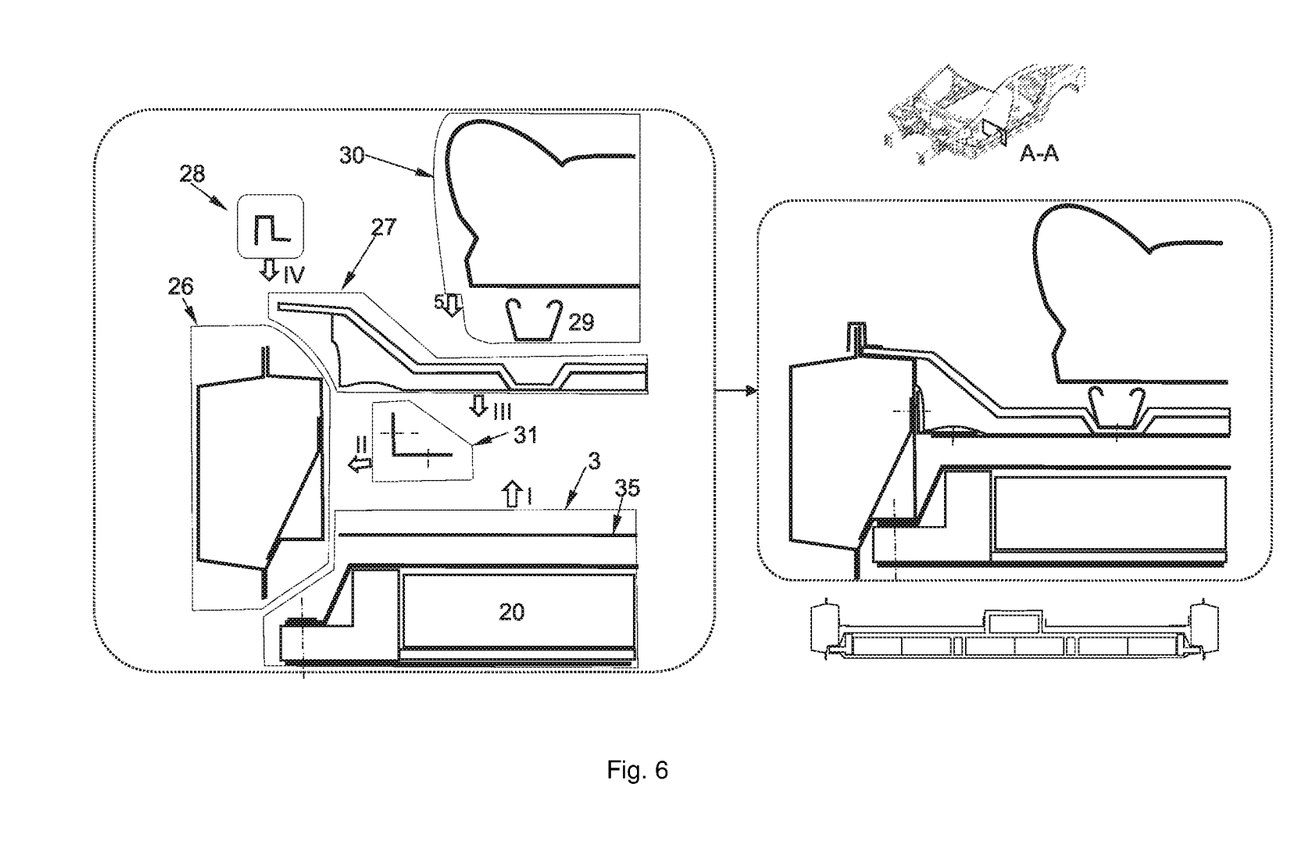
FIG. 6 illustrates the assembly of the main floor module of FIG. 5, in a region with a seat cross-member.
Figure 7:
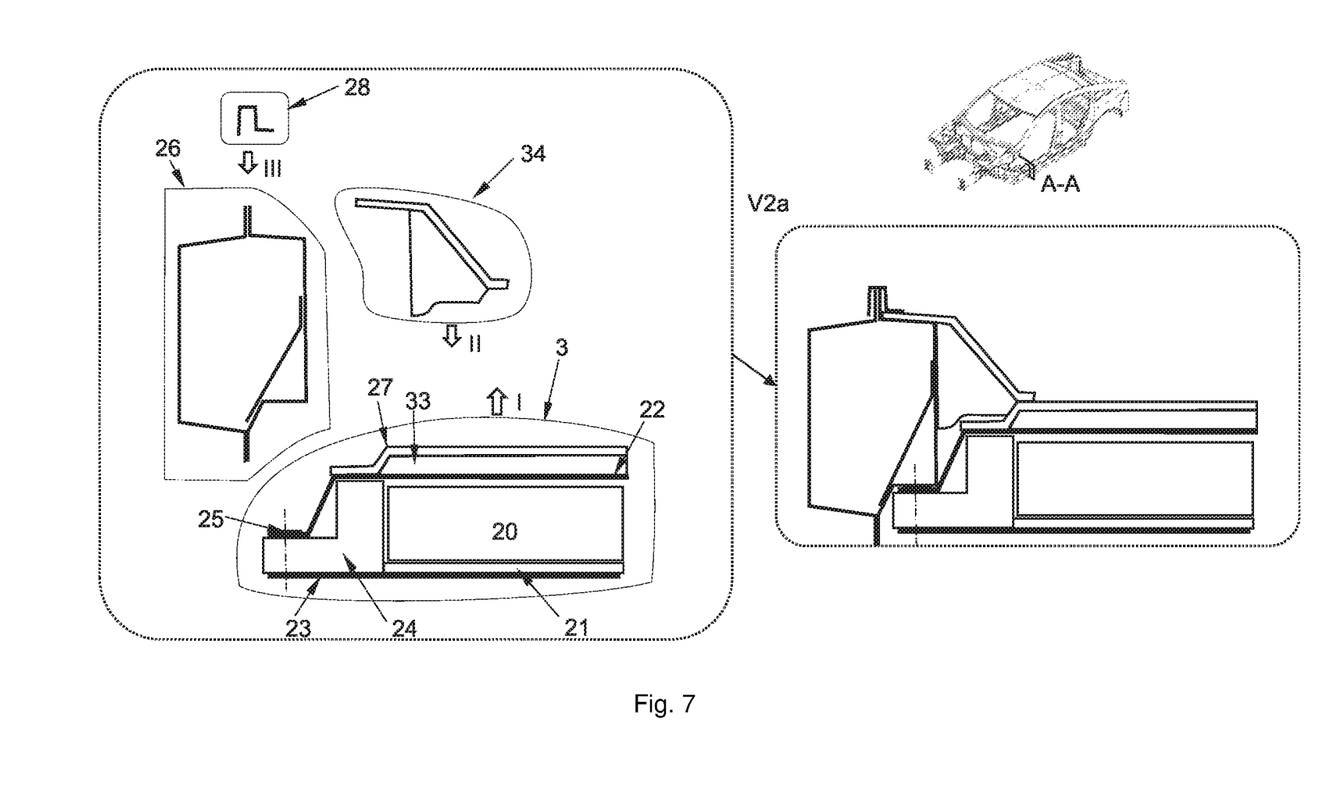
FIG. 7 illustrates the assembly of a main floor module with a shallow storage device on a platform, in accordance with embodiments.
Figure 8:
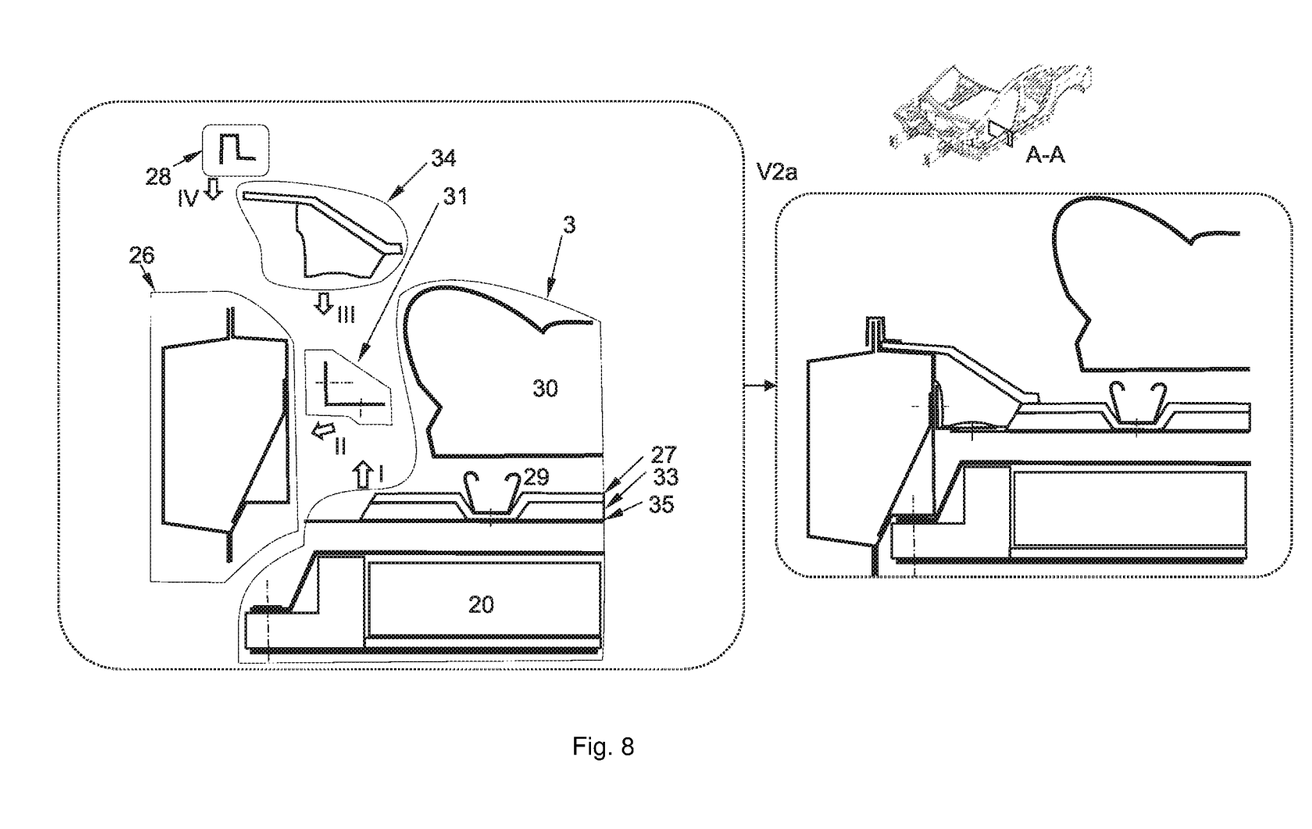
FIG. 8 illustrates the assembly of the main floor module of FIG. 7, in a region with a seat cross-member.
Figure 9:
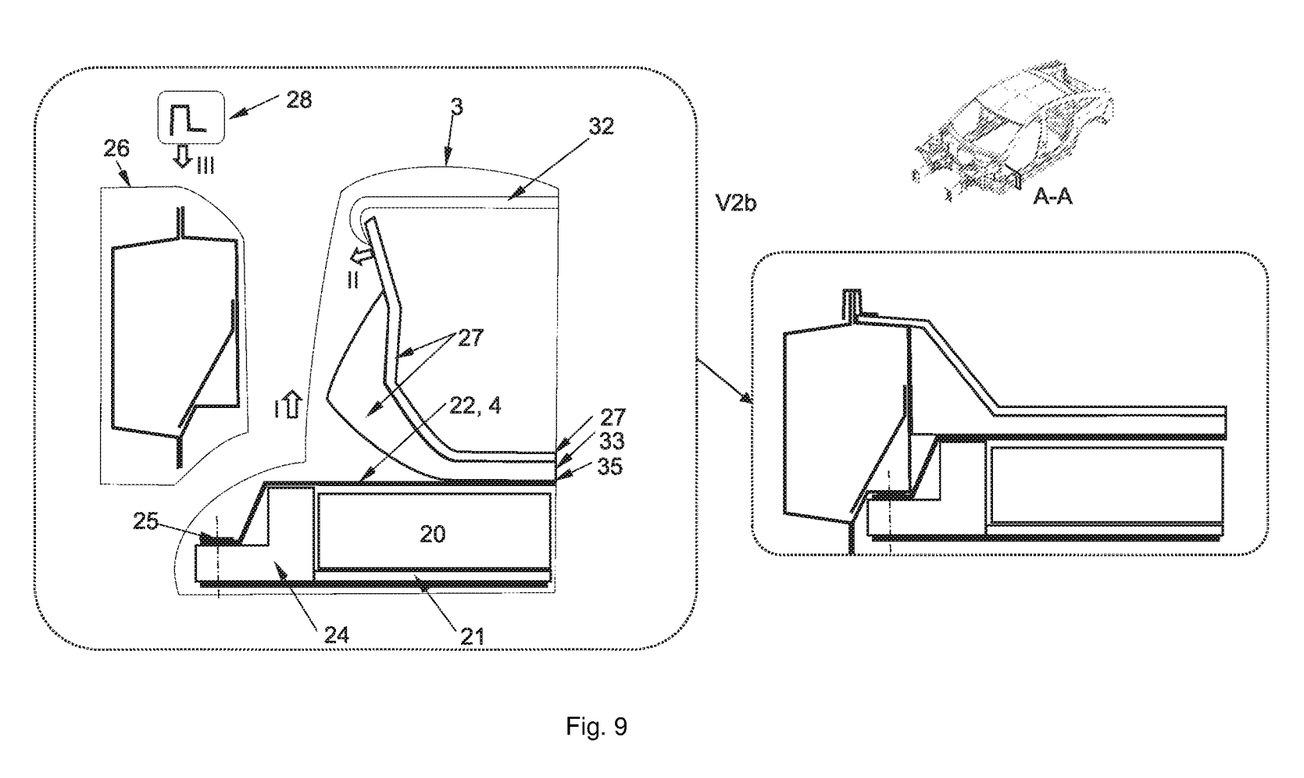
FIG. 9 illustrates the assembly of a main floor module with a shallow storage device on a platform, in accordance with embodiments.
Figure 10:
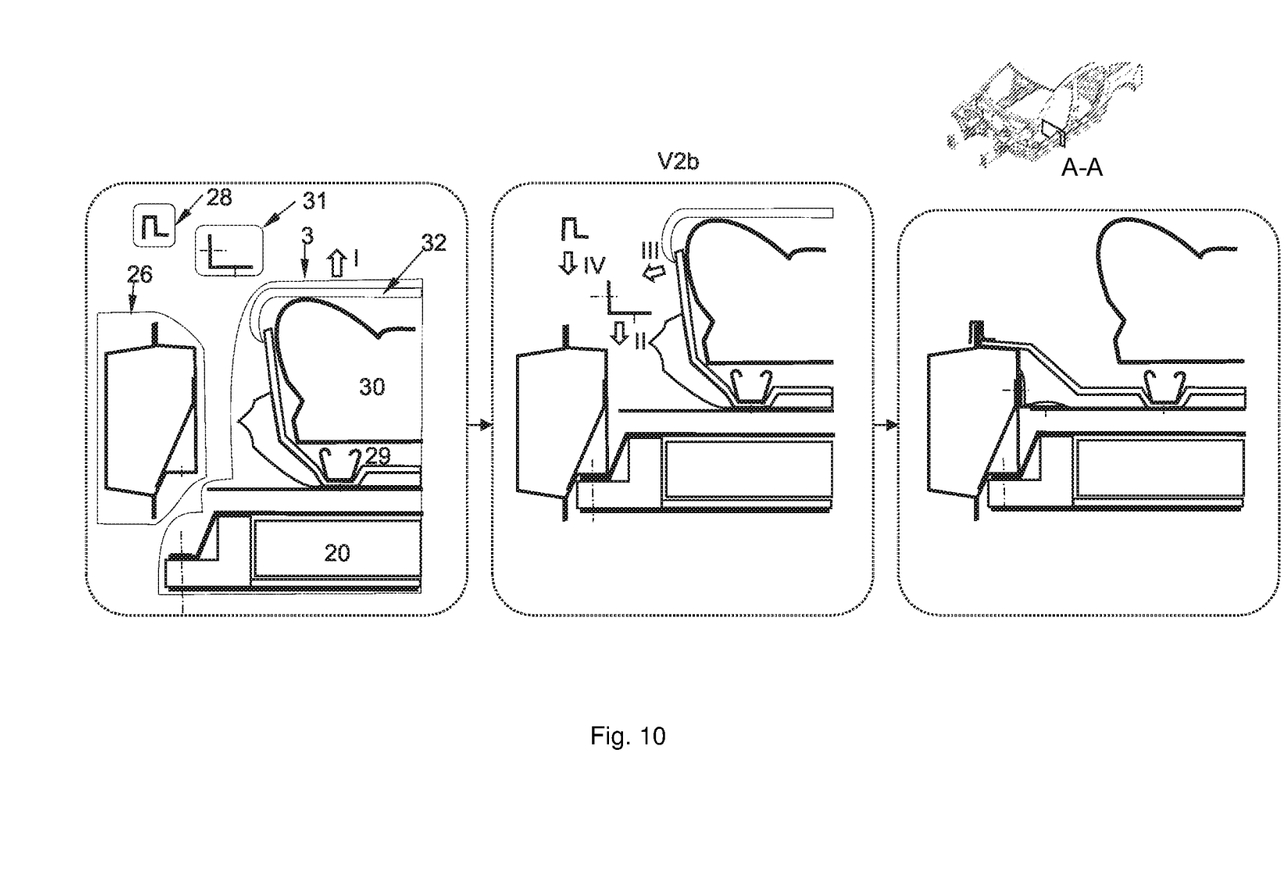
FIG. 10 illustrates the assembly of the main floor module of FIG. 9, in a region with a seat cross-member.

FIGS. 5 to 10 each show sectional illustrations of details of the process for assembling various drive-specific main floor modules 3 (left) and the fully assembled main floor modules 3 (right) and, more precisely, alternately in a region outside a seat cross-member (FIGS. 5, 7, 9) and in the region of a seat cross-member (FIGS. 6, 8, 10). The assembly direction is illustrated in each case by an arrow in the representation on the left and proceeds from the bottom upwards for the main floor module 3. A possible assembly sequence is indicated in each case by roman numerals. The fully assembled state is then illustrated in each case in the representation on the right. The particular section plane A-A on the vehicle body is indicated in each case in small representations.

FIG. 5 illustrates the attaching of a main floor module comprising a shallow storage device, namely, a battery module 20 with a battery module carrier 21 and a battery cover 22, which also represents the main floor 4, with a lower battery cover 23 and a battery frame 24, and with a seal and/or assembly adhesive and screw connection 25. In addition to the main floor module 3, an interior component, such as, for example, a carpet 27, is assembled on the body shell, namely a door sill 26, and then a door seal 28 is applied for sealing between the door sill 26 and the carpet 27.

FIG. 6 illustrates, in a similar manner to FIG. 5, a section of the same embodiment of FIG. 5 or an expanded embodiment in the region of a seat cross-member 35. Seat rails 29 and seats 30 may be supported on the seat cross-member 35, which may be a component of the main module carrier 3. To prevent blocking points and therefore collisions at the joints, these may be bridged by assembly aids 32, such as angle brackets 31, after the joining procedure. For example, seat cross-members 35 may be connected to a sill 26 of the platform 1 via brackets, in particular, via angle brackets 31, to produce a continuous load path.

In the embodiment of FIGS. 7 and 8, the main floor module 3 is already equipped with a partial carpet 27, namely a central carpet in the longitudinal direction, with an underlying insulating foam 33, as is also illustrated in the second variant V2a in FIG. 1. The carpet 27 is completed at the sides by edge carpet pieces 34. Door seals 28 are then installed.

In the embodiment of the section illustrated in FIG. 8, the main floor module 3 already additionally has a seat or a plurality of seats 30 or bench seats in seat rails 29 at the time of attaching to the sill 26.

The main floor module 3 of the embodiment of FIGS. 9 and 10 has a complete carpet 27, which is folded up at the sides at the time of assembly of the main floor module 3 via assembly aids 32, and also one or more already assembled car seats 30, corresponding to the second variant V2b of the main floor module 3 illustrated in FIG. 1. After the attaching of the main floor module 3 from below (I), the angle bracket 31 is assembled for securing the seat cross-member (II), the carpet 27 is folded down (III) and the door seal 28 is applied (IV).

In summary, standard platforms 1 in the first variant V1 and standard bodies 2 in the second variant V2 may be dip-coated separately (cathodic dip coating CDC) and top coated (according to the designed vehicle colors) and held in store. (Drive-)specific floor groups, i.e., main floor modules 3 with main floors 4, which are already equipped specifically to the drive, are dip-coated in parallel/separately and held in storage. Since it is thus necessary to store (only) the standard platform 1 and/or standard body 2 as a unit body in the different colors, and not a plurality of body variants, as is conventional in the related art, this method realizes the advantage of reducing the vehicle body storage area.

In the actual vehicle assembly M, the specific main floor module 3 matching the respective vehicle model is incorporated in the standard platform 1 and/or the standard body 2 from below, via adhesive and/or screws.

This solution may also be used in a conventional assembly line or the existing assembly line may remain unaltered since the essential difference and advantage consists in the storage of bodies and/or in the reduction in the number of variants of the bodies themselves.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 Platform
2 Body
3 Main floor module
3.1 Main floor module with shallow storage device
3.2 Main floor module with shallow storage device
3.3 Main floor module with combustion engine drive module
3.4 Main floor module with hybrid drive module
3.5 Main floor module with alternative drive module
4 Main floor
5 Drive-specific components
7 Carpet
8 Car seat
9 Side panel module
10 Roof module
11 Rear closure module
20 Battery module
21 Battery module carrier
22 (Upper) battery cover
23 Lower battery cover
24 Battery frame
25 Seal and screw connection
26 Door sill
27 Carpet
28 Door seal
29 Seat rail
30 Seat
31 Angle bracket
32 Assembly aid
33 Insulating foam
34 Carpet edge piece
35 Seat cross-member
A-A Section plane
A, B, C Variants of the main floor
E Construction-type (in accordance with embodiments)
H Construction type (conventional)
L Painting
M Assembly
P Paint buffer
R Body shell production
V1 $1^{st}$ variant
V2 $2^{nd}$ variant

What is claimed is:

1. A method for producing a motor vehicle having a body shell that includes a platform composed of metal and a vehicle body composed of metal which is fitted on the platform, the method comprising:
   producing, separately from a remainder of the body shell, a main floor module that includes a main floor of the body shell and at least one drive-specific component;
   assembling attachment parts on one or more of the platform or the vehicle body, after the dip coating, such that an assembly fitter or an assembly tool may utilize accessibility to an interior of the motor vehicle through an open floor of the body shell; and
   attaching the main floor module to one or more of an already dip-coated platform or an already dip-coated vehicle body.

2. The method of claim 1, wherein attaching main floor module comprises attaching, in an assembly line, one or more of the main floor module to the already dip-coated platform, the already dip-coated body, or an already top coated vehicle body.

3. The method of claim 1, wherein at the time of attaching the main floor module to the remainder of the body shell, the main floor module comprises one or more of a carpet on the upper side of the main floor or at least one assembled car seat.

4. The method of claim 1, wherein one or more of the platform, the vehicle body, or the main floor module is/are stored after the dip coating and before the attaching of the main floor module to the remainder of the body shell.

5. The method of claim 1, wherein the at least one drive-specific component comprises a shallow storage device.

6. The method of claim 5, wherein the shallow storage device comprises one or more of a drive battery or a drive shaft for a combustion engine drive, an electric drive, a hybrid drive, or an alternative drive.

7. The method of claim 6, wherein the shallow storage device comprises a cover to cover the shallow storage device and also form the main floor of the body shell such that there is no clearance between the cover and the main floor.

8. The method of claim 1, further comprising attaching the main floor module to the platform in an assembly direction from above or from below.

9. The method of claim 8, further comprising, after the attaching of the main floor module to the platform, attaching body modules for forming the vehicle body.

10. The method of claim 9, wherein the body modules comprise one or more of a side panel module, a roof module, or a rear closure module.

11. The method of claim 10, wherein the body modules are already equipped, at the time of attaching to the platform, with one or more of interior trims, electric cables, carpets, or handles.

12. The method of claim 1, further comprising attaching the main floor module to a vehicle body having an already attached platform in an assembly direction from below.

13. A method for manufacturing a group of motor vehicles that includes at least a first motor vehicle and a second motor vehicle, the method comprising:
  producing, separately from a remainder of the body shell, a main floor module that includes a main floor of the body shell and at least one drive-specific component; and
  attaching the main floor module to one or more of an already dip-coated platform or an already dip-coated vehicle body,
  wherein identical main floor modules are attached to one or more of different platforms or different bodies of the first motor vehicle and the second motor vehicle.

14. A method for manufacturing a group of motor vehicles, the method comprising:
  producing, for each motor vehicle in the group, separately from a remainder of the body shell, a main floor module that includes a main floor of the body shell and at least one drive-specific component;
  assembling, for each motor vehicle in the group, attachment parts on one or more of the platform or the vehicle body, after the dip coating, such that an assembly fitter or an assembly tool may utilize accessibility to an interior of the motor vehicle through an open floor of the body shell;
  attaching, for each motor vehicle in the group, the main floor module to one or more of an already dip-coated platform or an already dip-coated vehicle body,
  wherein different main floor modules are attached to one or more of identical platforms or identical bodies of each motor vehicle in the group.

* * * * *